United States Patent [19]

Foreman

[11] Patent Number: 4,971,481
[45] Date of Patent: Nov. 20, 1990

[54] PNEUMATIC TUBE STOP DEVICE AND TERMINAL

[75] Inventor: Michael J. Foreman, Carrollton, Tex.

[73] Assignee: Communications Conveyor Co., Inc., Dallas, Tex.

[21] Appl. No.: 308,456

[22] Filed: Feb. 10, 1989

[51] Int. Cl.⁵ .............................................. B65G 51/16
[52] U.S. Cl. ........................................ 406/15; 406/21;
  406/83; 406/112; 406/179; 406/180
[58] Field of Search .................... 406/10, 12, 15, 21,
  406/83, 84, 112, 147, 148, 176, 177, 179, 180

[56] References Cited

U.S. PATENT DOCUMENTS

| | | | |
|---|---|---|---|
| 592,765 | 11/1897 | Casey | 406/21 |
| 2,016,946 | 10/1935 | Scanlan | 406/148 X |
| 3,790,102 | 2/1974 | Tearne | 406/112 |

*Primary Examiner*—Sherman Basinger
*Attorney, Agent, or Firm*—Richards, Medlock & Andrews

[57] ABSTRACT

The present invention describes a stop device for stopping a carrier traveling in a pneumatic tube. The invention also includes a terminal comprising the stop device. The stop device includes a pneumatic tube having an exhaust aperture and a shutoff aperture and a pressure sensing monitor in fluid communication with the shutoff aperture. The pressure monitor senses the pressure change in the shutoff aperture caused by the carrier's movement past the shutoff aperture and activates a switch shutting off the pneumatic source. The carrier impacts an end stop and settles down on a catch which was also activated by the pressure monitor. The carrier is held in front of a door through which the carrier may be readily retrieved.

17 Claims, 3 Drawing Sheets

PNEUMATIC TUBE STOP DEVICE AND TERMINAL

TECHNICAL FIELD

The invention relates to a stop device for use in stopping a carrier traveling in a pneumatic tube and to a terminal including the stop device.

BACKGROUND OF THE INVENTION

The invention relates to a device for stopping a carrier traveling in a pneumatic transmission line and also to a terminal for a pneumatic transmission line. The invention may be used in various types of pneumatic transmission systems and is especially useful in systems that operate at lower speeds.

Pneumatic transmission systems are widely known and used to transmit articles from one place to a remote location. Pneumatic transmission or delivery systems consist of tubes or conduits in which a carrier containing information travels by means of pneumatic pressure. The pressure may be provided by a blower and/or vacuum system. A common use of pneumatic transmission systems is in drive-in bank tellers where business is conducted by a carrier transmitted between the bank and a remote terminal. Other uses for pneumatic transmission systems include sending documents between floors in a building or from one office to another office located some distance apart. Pneumatic transmission systems that are capable of operating at slower speeds may be used in transmitting blood samples and other more "fragile" cargo.

In previous pneumatic transmission systems, a problem existed in stopping the carrier once it reached its intended location. In many systems, the carrier, traveling at speeds of 15-20 ft/sec or higher, impacts a mechanical trigger that shuts off the blower or vacuum, and the carrier continues to a second impact with a stop or block at the end of the transmission line. The carrier bounces off the stop and is caught by the same mechanical trigger or some other catch device. In these systems, the carrier and mechanical trigger are subjected to impacts that are highly undesirable and that results in wear and tear on the carrier and the trigger mechanism. The use of a mechanical trigger to shutoff the pneumatic source requires that the carrier be traveling at a high enough speed to actuate the trigger. Thus, the higher speed required to activate the trigger causes a greater impact. The high speed and resulting impact eliminates the possibility of using such systems to transmit "fragile" articles such as blood samples.

Some systems have designed a deceleration zone in which the carrier decelerates prior to entering the terminal area and impacting an end stop. One such system is disclosed in U.S. Pat. No. 4,180,354 to Greene, the disclosure of which is incorporated herein by reference. Greene discloses a transmission system using a check valve that reroutes the air behind the carrier and allows the carrier sufficient time to decelerate before discharging into an open remote terminal. Other attempts to resolve the problem of the impact have included the use of other mechanical means in place of the trigger to shutoff the stream of air. These include items such as a photocell, a timing device, limit switch, spring catch, and combinations thereof.

The present invention provides a new and different means for stopping the carrier and shutting off the pneumatic source. The invention does not use a mechanical trigger or timing device, and it eliminates the need for an extended deceleration region prior to the terminal. The present invention further allows operation of the carrier at much slower speeds, and thus, the system is better able to transport "fragile" articles.

SUMMARY OF THE INVENTION

The invention provides a device for stopping a carrier in a pneumatic transmission system and shutting off the pneumatic source. The invention is preferably embodied in a terminal positioned at the end of a transmission line or at an intermediate station along the transmission route. The invention is adaptable to be used with various types of pneumatic transmission systems and provides the distinct advantage of allowing operation of the system at slower speeds.

The invention comprises a pneumatic tube capable of transmitting a carrier via a stream of air provided by a pneumatic source such as a blower or vacuum. The pneumatic tube has an exhaust aperture and a shutoff aperture with the exhaust aperture being positioned beyond the shutoff aperture along a designated path of travel for the carrier. A differential pressure sensing means is connected to said shutoff aperture for sensing the carrier's movement by the pressure change within the aperture. Engageable with the sensing means is a switch means for shutting off the stream of air provided by the pneumatic source once the carrier has moved beyond the shutoff aperture. If the invention is to be used in a terminal at the end of a transmission line, then the invention further includes an end stop positioned within the tube beyond the exhaust aperture providing an impact point for the carrier and reversing its direction of travel. If the invention is to be used in an intermediate station, then some other stop means, such as a donut stop, may be used to stop the forward travel of the carrier. In a preferred embodiment, the stop device further includes catch means actuated by the sensing means for catching the carrier after its impact with the stop means.

In a preferred embodiment, the sensing means comprises an air cylinder with a piston held within the cylinder. The piston is actuated by the pressure change as the carrier moves beyond the shutoff aperture. The switch means is actuated by the movement of the piston and shuts off the pneumatic source. In a preferred embodiment, a lever arm is slidably engaged with the piston, and the movement of the piston causes the lever arm to contact a switch thereby shutting off the pneumatic source. The lever arm is also preferably attached to a catch or detent that extends into the pneumatic tube to block the return path of the carrier in the tube. The catch is actuated by the piston's action on the lever arm.

The present invention further provides a terminal that includes the stop device as just described and having a door that provides access to the carrier. In a preferred embodiment, the carrier, after impacting the end stop settles down on the catch and is held there until the door is opened and the carrier is retrieved. The invention further provides a transmission system including a transmission line, a pneumatic source and one or more terminals.

BRIEF DESCRIPTION OF THE DRAWINGS

The foregoing and additional objects and advantages of the invention will be more apparent when the following Detailed Description is read in conjunction with the accompanying Drawings, wherein like reference characters denote like parts in all views and wherein.

DETAILED DESCRIPTION

The present invention provides a unique stop device and terminal for a pneumatic transmission system. The invention has the advantages of eliminating any contact between the carrier and a mechanical trigger thereby allowing the carrier to be propelled at a slower speed than conventional systems and reducing the wear and tear on the carrier. Further, as the system can be operated at slower speeds, it results in energy savings and allows for the transport of more fragile cargo.

Figure 1:
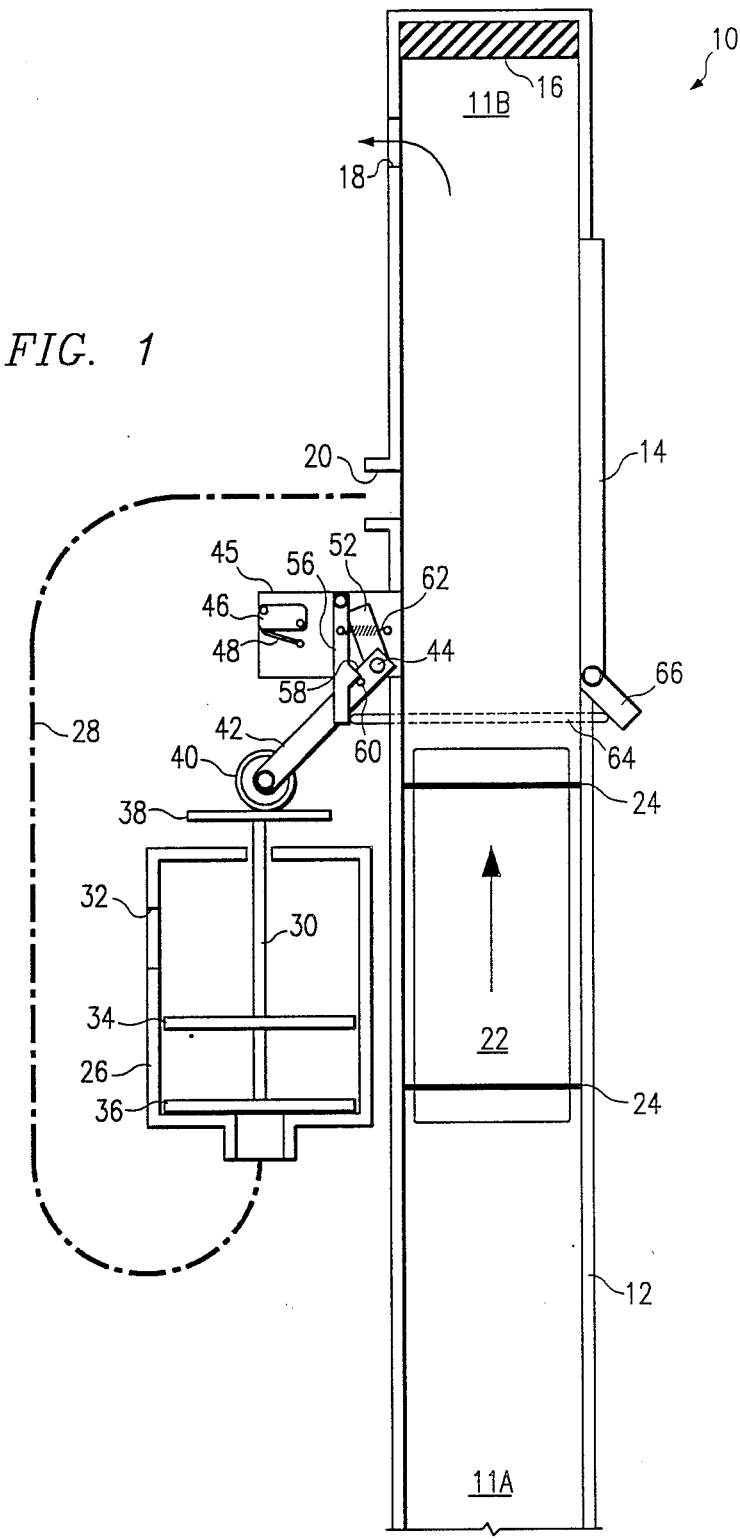
FIG. 1 is a cutaway view of a terminal as described by the present invention showing the carrier approaching the terminal.
Figure 2:
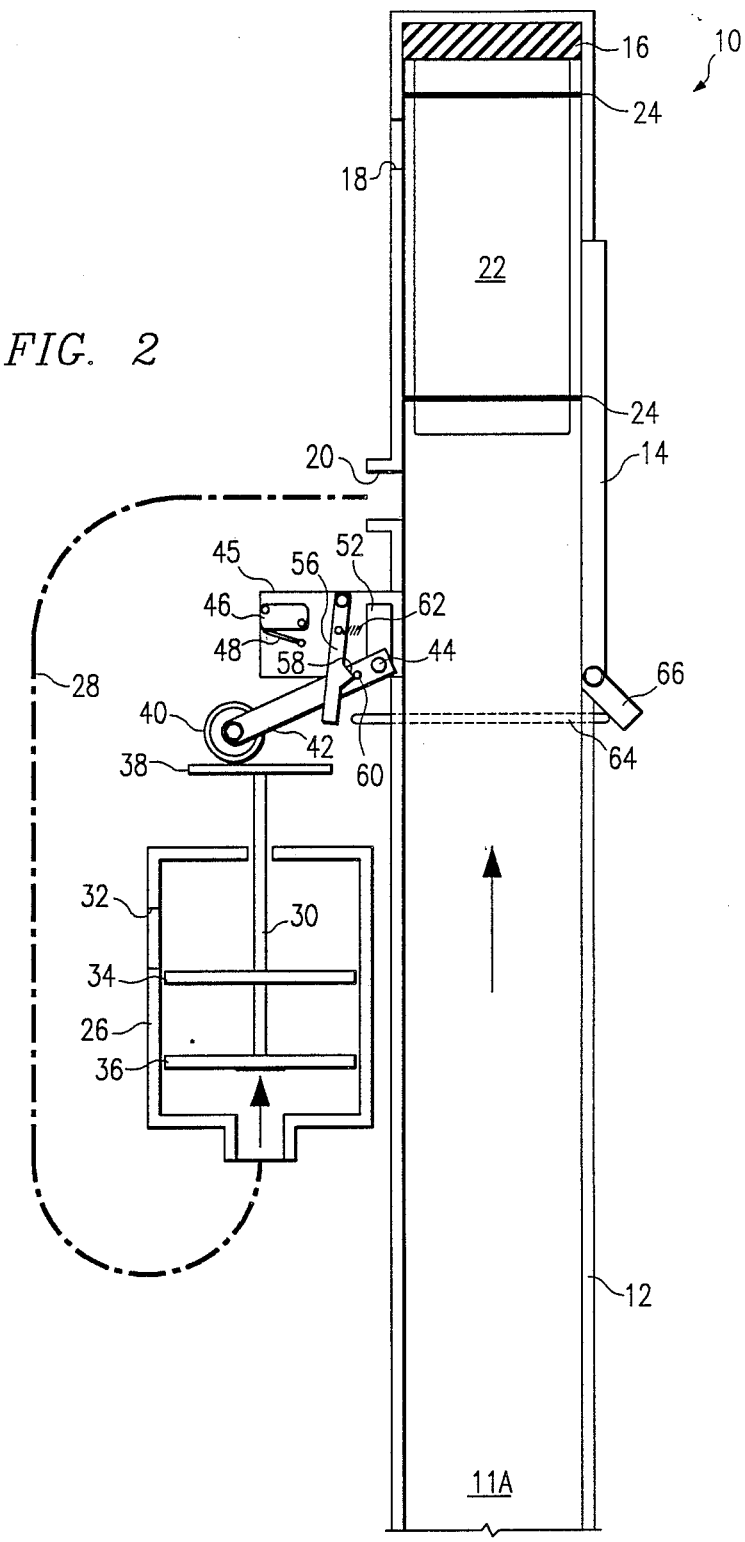
FIG. 2 shows the carrier impacting the end stop and the actuation of the sensing means caused by the carrier passing the shutoff aperture.
Figure 3:
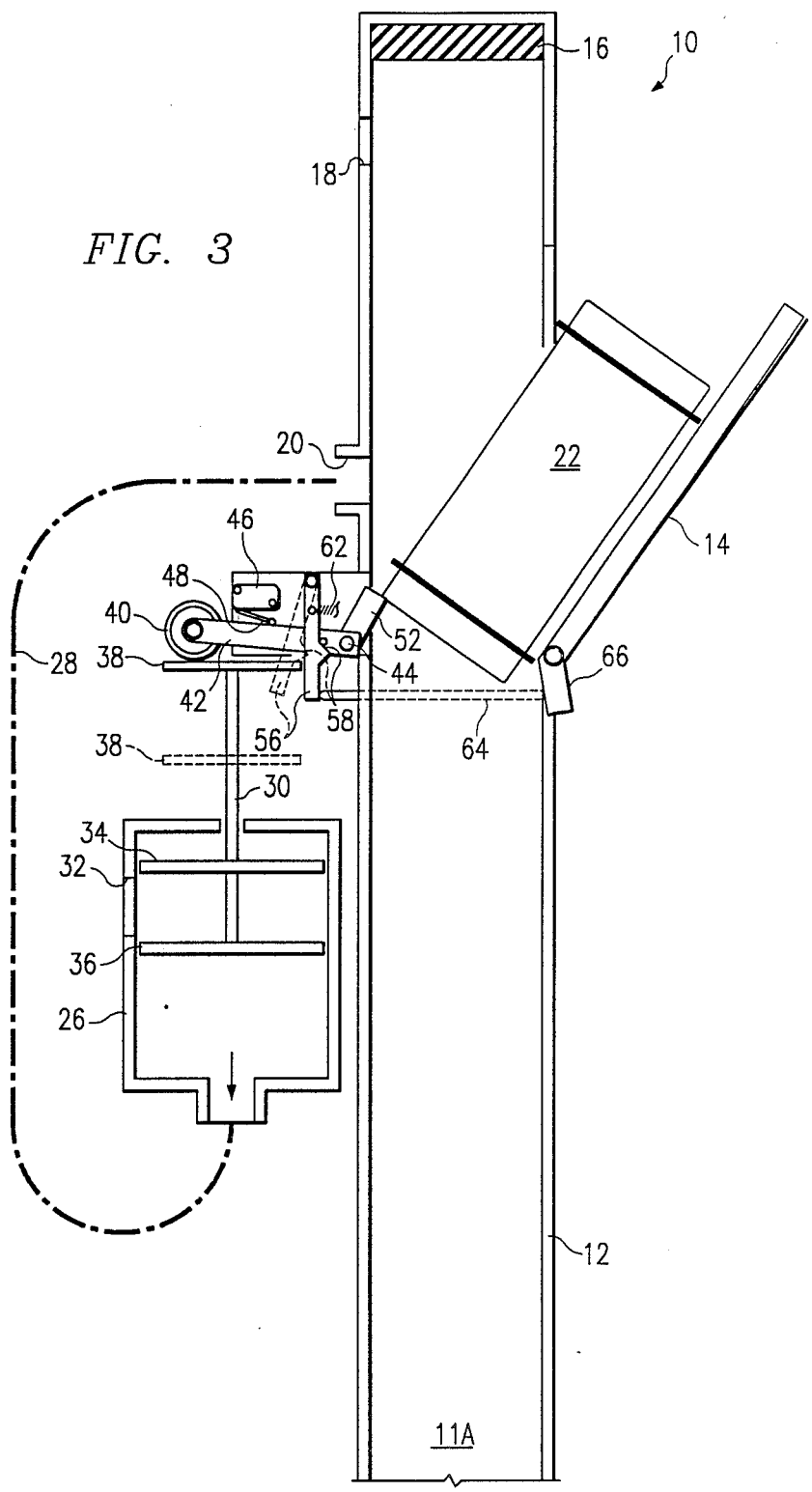
FIG. 3 shows the carrier held in the open door of the terminal.

Referring now to the drawings, FIG. 1 shows a preferred embodiment of the stop device as embodied in a terminal of the present invention. FIG. 1 shows a terminal generally indicated as 10 comprising a pneumatic tube 12, door 14, end stop 16, exhaust aperture 18, and shutoff aperture 20. A carrier 22 is shown traveling in the direction of the indicated arrow within tube 12 and towards end stop 16. Carrier 22 is circular in shape and has seals 24 which are annular in shape and have an outer diameter that is substantially the same as the inner diameter of tube 12. Carrier 22 is propelled by a stream of air produced by a pneumatic source that may be either a blower shown as 11A in FIG. 1 or a vacuum shown as 11B. FIGS. 1-3 show the invention as it would operate with a blower located behind the carrier 22. The air within tube 12 is exhausted through exhaust aperture 18 as carrier 22 moves toward end stop 16. The system may also be arranged with a vacuum attached to aperture 18 with only slight modifications to the mechanisms and configurations shown in FIGS. 1-3.

Terminal 10 as shown in FIGS. 1-3 also comprises sensing means, switch means, and catch means. In the preferred embodiment shown, the sensing means comprises an air cylinder 26 that is connected to shutoff aperture 20 by air line 28. Air cylinder 26 includes a piston 30 held within cylinder 26 and a portion of which extends beyond cylinder 26 and a piston exhaust aperture 32. Preferably, piston 30 includes a displacement limiter which limits the distance piston 30 may be displaced within cylinder 26. In the embodiment shown in FIGURES 1-3, the displacement limiter consists of a second face 34 on piston 30. Second face 34 is spaced appropriately from a first face 36 so as to limit the displacement of piston 30 within cylinder 26. Additionally, exhaust 32 is positioned so as to be constantly above face 36 in order to prevent pressurized air from tube 28 from exhausting through piston exhaust 32. Piston 30 also includes a third face 38 that is located outside of cylinder 26.

The switch means are operably engageable with the sensing means, and in the preferred embodiment shown in FIG. 1, a switch 46 is engaged with piston 30 through a lever arm 42. A roller 40 is attached to lever arm 42 which is mounted on rod 44. Switch 46 is mounted on a casing 45 and includes probe 48 which is extended so as to contact lever arm 42 when arm 42 is in a raised position. A catch 52 is also mounted on rod 44 and is fixed at a particular angular displacement from lever arm 42. Thus, as lever arm 42 is raised to the horizontal position shown in FIG. 3, catch 52 rotates in a clockwise direction about rod 44 so that it protrudes into tube 12 as shown in FIG. 3. Also shown in the FIGURES is arm 56 having detent 58 that is rotatably mounted to casing 45. Detent 58 is formed having an inclined ramp on its lower face and a more horizontal ramp in its upper face which serves to hold catch 52 and arm 42 in an up position via rod 60. Arm 56 is biased in a forward direction toward tube 12 by spring 62. A rod 64 is engaged with arm 56 and door portion 66 such that when door 14 is opened portion 66 forces rod 64 against arm 56 and moves it against the bias of spring 62. The movement of arm 56 allows rod 60 to slide over detent 58 and lever arm 42 to return to its down position shown in FIG. 1.

In operation, carrier 22 is propelled by a stream of pressurized air and travels within tube 12 in the direction indicated by the arrows in FIG. 1. The air within tube 12 ahead of carrier 22, and any air escaping around seals 24, exhausts through aperture 18. Carrier 22 is propelled at a relatively constant speed as it approaches terminal 10 as no deceleration region is necessary with the present invention. Once carrier 22 passes shutoff aperture 20, the pressurized air behind carrier 22 is routed through line 28 and into air cylinder 26.

In a preferred embodiment, piston 30 is constructed to be approximately the same size in diameter and weight as carrier 22. This insures that if there is sufficient air pressure to move carrier 22 in tube 12, then there is sufficient air pressure to move piston 30 within cylinder 26. The pressurized air forces piston 30 in an upward direction as shown in FIG. 2 with any air in the cylinder behind face 34 being exhausted through exhaust 32. Piston 30 preferably seals cylinder 26 against pressure loss so that the pressure in line 28 and in tube 12 is maintained.

As piston 30 moves in an upward direction, it forces lever arm 42 to be raised to the nearly horizontal position shown in FIG. 3. At this point, lever arm 42 contacts probe 48 thereby activating switch 46 which turns off the blower. The pressure in tube 12 is maintained at least momentarily before it leaks out of the system. As catch 52 is rigidly attached to lever arm 42, catch 52 is extended into tube 12 protruding far enough to block carrier 22 from falling back down tube 12.

Meanwhile, carrier 22 has continued to the end of tube 12 as shown in FIG. 2 until it impacts with end stop 16. In order for the pressurized air behind carrier 22 to activate piston 30, it is necessary for end stop 16 to be at least one carrier's length from shutoff aperture 20. With pressurized air still behind it, carrier 22 settles relatively slowly back down on a cushion of pressurized air until it contacts catch 52 and is held in place within tube 12. As shown, catch 52 is placed nearly opposite door 14 so that carrier 22 is held in an accessible position. As the pressure in the system is relieved, piston 30 settles back down within cylinder 26, but the detent 58 on arm 56 retains catch 52 and lever arm 42 in position. As door 14 is opened, carrier 22 is tilted outward by catch 52 and is readily accessible for retrieval. Also, as door 14 is opened, door portion 66 forces rod 64 against arm 56 and against the bias of spring 62 thereby moving it out of the way to allow rod 60 to slide over detent 58 and lever arm 42 to return to its original position as shown in FIG. 3 since it is rigidly connected to catch 52. As long as carrier 22 remains seated upon catch 52, however, lever arm 42 is retained in its upward position.

Once carrier 22 is removed, lever arm 42 and catch 52 return to their original positions shown in FIG. 1.

It is important that door 14 maintains a tube environment to allow carrier 22 to pass without obstruction. Thus, door 14 is preferably rounded in shape. Further, like the rest of the transmission system, it is preferred that door 14 be at least somewhat capable of sealing with tube 12 in order to minimize air loss through the joints of door 14 and tube 12.

The preferred embodiment shown in FIGS. 1-3 may be modified to work with a vacuum instead of a blower. A vacuum may be applied to tube 12 through exhaust aperture 18. One simple modification to convert the system to a vacuum would include adding a spring to air cylinder 26 to bias piston 30 towards its upward position. With the vacuum applied at aperture 18, piston 30 would be held in the down position as shown in FIG. 1. As carrier 22 passes shutoff aperture 20, the vacuum on piston 30 would be relieved and the spring would bias piston 30 to its up position thereby shutting off the vacuum. The action of the other elements would be as described for the blower system. Similarly, other modifications may be made to convert the system from a blower to a vacuum. Terminal 10 may also be easily converted to an intermediate station in a transmission system from the end terminal shown in the FIGURES.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the scope of the present invention.

I claim:

1. A terminal for use in a pneumatic transmission system, said terminal comprising:
    a pneumatic tube capable of transmitting a carrier using a stream of air produced by a pneumatic source, and said tube having an exhaust aperture and a shutoff aperture along its length, said exhaust aperture being positioned beyond said shutoff aperture along a designated path of travel for the carrier;
    a switch connected to the pneumatic source;
    sensing means in fluid communication with said shutoff aperture for sensing a pressure change in said aperture caused by the carrier's movement past the shutoff aperture and activating said switch to shutoff the stream of air from the pneumatic source;
    a door defined within a portion of said tube;
    an end stop positioned within said tube at least one carrier's length beyond said shutoff aperture; and
    catch means engaged with said sensing means for catching the carrier after the carrier's impact with the end stop.

2. The terminal of claim 1 wherein said sensing means comprises an air cylinder with a piston movable within said cylinder whereby the pressure change caused by the carrier's movement past the shutoff aperture causes the piston to move within said cylinder.

3. The terminal of claim 2 wherein said cylinder is substantially sealed to maintain the pressure in said pneumatic tube.

4. The terminal of claim 1 further comprising deployment means engaged with said sensing means for deploying said catch means into a position within said tube after the carrier passes the shutoff aperture.

5. The terminal of claim 4 wherein said deployment means comprises a lever arm rigidly affixed to said catch means and slidably engaged with said sensing means.

6. The terminal of claim 4 further comprising latch means for holding said catch means in a position to contact the carrier.

7. The terminal of claim 6 further comprising a rod in communication with said door and said catch means for releasing said catch means by opening said door.

8. A stop device for stopping a carrier traveling in a pneumatic tube, said device comprising:
    a pneumatic tube capable of transmitting a carrier using a stream of air, said tube having an exhaust aperture and a shutoff aperture along its length, said exhaust aperture being positioned beyond said shutoff aperture along a designated path of travel for said carrier;
    switch means for shutting off the stream of air;
    sensing means in fluid communication with said shutoff aperture for sensing a pressure change in said aperture caused by the carrier's movement past said shutoff aperture, said sensing means capable of activating said switch means to shutoff the stream of air upon sensing a pressure change;
    stop means positioned within said tube at least one carrier's length beyond said shutoff aperture for stopping the carrier's movement in the direction of the designated path of travel; and
    catch means engaged with said sensing means for catching the carrier after the carrier's impact with the stop means.

9. The stop device of claim 8 wherein said catch means is engaged with said sensing means through a lever arm rigidly attached to said catch means at one end and slidably engaged with said sensing means at its other end.

10. The stop device of claim 8 further comprising deployment means engaged with said sensing means for deploying said catch means into said pneumatic tube after the carrier has passed said shutoff aperture.

11. The stop device of claim 10 further comprising latch means for holding said catch means in its deployed position within said pneumatic tube at least until said carrier contacts said catch means.

12. The stop device of claim 8 further comprising a door defined in a portion of said pneumatic tube.

13. A stop device for stopping a carrier traveling in a pneumatic tube, said device comprising:
    a pneumatic tube capable of transmitting a carrier using a stream of air produced by a pneumatic source, said tube having an exhaust aperture and a shutoff aperture along its length, said exhaust aperture being positioned beyond said shutoff aperture along a designated path of travel for the carrier;
    switch means connected to said pneumatic source for shutting off the stream o air from said source;
    an air cylinder in fluid communication with said shutoff aperture, said cylinder including a piston movable within said cylinder;
    a lever arm engaged with said piston and engageable with said switch means;
    an end stop positioned at least one carrier's length beyond said shutoff aperture; and a catch means engaged with said piston whereby said catch means catches the carrier after impact with said end stop.

14. The stop device of claim 13 wherein said catch means comprises a detent engaged with said lever arm and extendable into said tube.

15. The stop device of claim 13 further comprising deployment means engaged with said catch means for deploying said catch means into said tube after the carrier has passed the shutoff aperture.

16. The stop device of claim 13 further comprising latch means for retaining said catch means in its deployed position at least until said carrier contacts said catch means.

17. A stop device for stopping a carrier traveling in a pneumatic tube, said device comprising:

a pneumatic tube capable of transmitting a carrier using a stream of air, said tube having an exhaust aperture and a shutoff aperture along its length, said exhaust aperture being positioned beyond said shutoff aperture along a designated path of travel for a carrier;

switch means for shutting off the stream of air;

sensing means in fluid communication with said shutoff aperture for sensing a pressure change in said aperture caused by the carrier's movement past the shutoff aperture, said sensing means capable of activating said switch means to shut of the stream of air upon sensing a pressure change;

a stop means positioned within said tube at least one carrier's length beyond said shutoff aperture for stopping the carrier's movement int eh direction of the designated path of travel; and a door defined in a portion of said pneumatic tube proximate said stop means.

* * * * *